Feb. 11, 1969
W. G. REDMOND, JR
3,427,522
ALL-ELECTRONIC SYNCHRONIZER
Filed Sept. 18, 1964
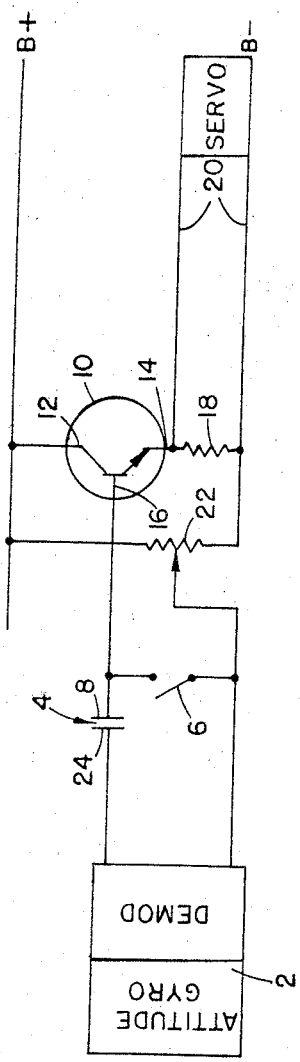
WILLIAM G. REDMOND
INVENTOR
BY Robert M. Sperry
ATTORNEY

3,427,522
ALL-ELECTRONIC SYNCHRONIZER
William G. Redmond, Jr., Arlington, Tex., assignor to Ling-Temco-Vought, Inc., Dallas, Tex., a corporation of Delaware
Filed Sept. 18, 1964, Ser. No. 397,558
U.S. Cl. 318—489
Int. Cl. H02p *1/02*
6 Claims

ABSTRACT OF THE DISCLOSURE

This invention relates to means for sensing variations in a first electrical signal and for controlling a second signal in a manner responsive to such variations by connecting a capacitor across the source of the first signal in series with switch means operable, in a first condition, to cause the voltage on the capacitor to vary with the source and operable, in a second condition, to cause the capacitor to store a desired voltage and connecting a current regulating device to pass current in an amount responsive to the difference between the voltage on the capacitor and the voltage of the source.

---

This invention relates to synchronizing means and is particularly directed to completely electronic synchronizing means for sensing variations in a first electrical signal and for controlling a second electrical signal in a manner functionally related to the variations of said first electrical signal.

In automatic pilot systems for airplanes and the like, synchronizing means are employed to sense the electrical output of attitude reference gyroscope devices and to supply control signals to the appropriate servomechanisms to maintain the airplane in a desired attitude. Unfortunately, the synchronizing means of the prior art have been complex electromechanical devices including involved electronic amplifying and switching circuits, motor-tachometer combinations, gear trains, and feedback transducers. Moreover, most automatic pilot systems include four or more synchronizing means which account for approximately one-third of the size and weight of the system and a very substantial portion of the cost.

These disadvantages of the prior art are overcome with the present invention and novel synchronizing means is provided which employs a completely electronic circuit and requires no mechanical parts. Moreover, the device of the present invention is extremely simple, compact, lightweight, and economical; yet is rugged, reliable and requires no maintenance.

The advantages of the prior art are preferably attained by providing a capacitor connected to be charged by a variable voltage control signal source, such as the demodulated signal from an attitude reference gyroscope. A current regulating device, such as a vacuum tube, transistor or the like, is connected to pass current in an amount responsive to the voltage appearing across the capacitor. An output circuit is provided including means for establishing a voltage thereacross having a value functionally related to the amount of current passed by said current regulating device. In addition, switch means are provided in series with said capacitor and said control signal source to "lock" said capacitor at any desired voltage. With this arrangement, when the switch means is closed, the voltage across the capacitor will vary with the voltage of the control signal source and no signal will appear on the output circuit. When the switch means is open, the voltage across the capacitor will be "locked" at a desired value and hence, subsequent variations of the control signal will be passed to the output circuit.

Accordingly, it is an object of the present invention to provide improved synchronizing means.

Another object of the present invention is to provide improved synchronizing means employing a completely electronic synchronizing circuit requiring no mechanical parts.

An additional object of the present invention is to provide improved synchronizing means which is simple, compact, lightweight and economical; yet is rugged, reliable, and requires no maintenance.

A specific object of the present invention is to provide improved synchronizing means comprising a variable voltage control signal source, a capacitor connected across said source, switch means connected in series between said control signal source and one side of said capacitor, current regulating means connected to pass current in an amount responsive to the voltage appearing across said switch means, an output circuit, and means for establishing a voltage across said output circuit having a value functionally related to the amount of current passed by said current regulating means.

These and other objects and features of the present invention will be apparent from the following detailed description taken with reference to the figure of the accompanying drawing.

In the drawing:

FIGURE 1 is a circuit diagram of a synchronizing means embodying the present invention.

In the form of the present invention chosen for purposes of illustration in the drawing, FIGURE 1 shows a variable voltage control signal source 2. For automatic pilot systems, the control voltage source 2 will be the direct current signal coming either directly or by demodulation from an attitude reference gyroscope. However, it will be apparent that any variable voltage source may be employed. Moreover, it should be noted that the source 2 may be of either polarity and, in fact, may reverse polarity during operation. A capacitor 4 is connected across the control voltage source 2 and a switch 6 is connected in series between one side 8 of the capacitor 4 and the corresponding side of the control voltage source 2. The switch 6 is preferably a switching diode or solid state switching device. However, a mechanical switch may be employed, if desired. A current regulating device 10, such as a transistor, field effect transistor, vacuum tube or the like, having a positive electrode 12, a negative electrode 14, and a control electrode 16, is provided and has the control electrode 16 thereof connected to capacitor 4, on the same side 8 as switch 6. It is essential that the current regulating device 10 presents a high resistance to current leakage through the control electrode 16. The positive electrode 12 is connected to a suitable source of positive voltage, not shown, while the negative electrode 14 is connected, through a voltage developing resistance 18, to the negative side of the output circuit. The output circuit, indicated by conductors 20, is taken across resistance 18 and, in an automatic pilot system, would supply actuating signals to appropriate servomechanisms. To complete the circuit, an adjusting resistance 22 is connected in shunt with the current regulating device 10 and resistance 18 and is tapped to switch 6 to adjust the current flow through the current regulating device 10 to produce a desired quiescent output voltage when the switch 6 is closed. Typically, this quiescent voltage will be half of the B+ supply voltage in order to permit positive and negative deviations from the quiescent value.

In use, in an automatic pilot system, the control voltage source 2 will be a direct current voltage signal from an attitude reference gyroscope, as indicated above, and will continuously provide a direct current signal having a voltage indicative of the attitude of the airplane. When the automatic pilot system is not engaged, switch 6 will be placed in its closed condition. Thus, as source 2 charges side 24 of capacitor 4, a balancing charge of equal magnitude and opposite polarity will be applied through switch 6 to side 8 of capacitor 4. At the same time, switch 6 connects resistor 22 to the control electrode 16 of the current regulating device 10. Because of this, only the desired quiescent current will be allowed to flow through the current regulating device 10 and the desired quiescent voltage will be developed across resistance 18 and will be supplied to the output circuit 20.

When the automatic pilot system is engaged, switch 6 will be placed in its open condition. When switch 6 is opened, the control electrode 16 of current regulating device 10 is disconnected from resistor 22. Also, since no balancing charge can flow to side 8 of capacitor 4, the charge "locked" on capacitor 4 will act as a voltage source opposing source 2. As long as the output of source 2 does not change, the "locked" charge on capacitor 4 will be equal and opposite. Hence, the voltage applied to control electrode 16 will remain the same as when switch 6 was closed. Subsequently, if the output voltage of source 2 should vary, the new output will be applied to side 24 of capacitor 4 and an error signal will be passed by capacitor 4 which will be applied to the control electrode 16 of the current regulating device 10. The magnitude of the error signal will be equal to the difference between the new output voltage of source 2 and the charge "locked" on capacitor 4. When this error signal is applied to the control electrode 16, it will vary the conductivity of the current regulating device 10 correspondingly. Hence, a voltage signal will be developed across resistance 18 having a magnitude functionally related to the magnitude of the error signal and this voltage signal will appear on the output circuit 20.

In the case of an automatic pilot system, the charge stored on capacitor 4 at the time switch 6 as opened, will correspond to the attitude of the airplane which the pilot wishes to hold and the subsequent variation in the signal from source 2 would be caused by the attitude reference gyroscope sensing a departure of the airplane from the desired attitude. The signal on output circuit 20 would then be supplied as an error signal to the appropriate servomechanisms to cause the airplane to be brought back to the desired attitude. As the airplane returns toward the desired attitude, the signal from source 2 will approach the value of the charge stored on capacitor 4. When the signal from source 2 is equal to the charge stored on capacitor 4, a balance condition will exist similar to the condition at the time that the automatic pilot system was engaged. Thus, the signal on output circuit will return to the quiescent value unless and until the signal from source 2 again indicates that the airplane has departed from the desired attitude. From the foregoing discussion, it will be seen that, as long as switch 6 is in the closed condition, the charge on capacitor 4 will vary directly with the signal from source 2 and no signal will be supplied to output circuit 20. In contrast, when switch 6 is open, capacitor 4 will store the value of charge appearing on it at the instant that switch 6 was opened. Any subsequent variation of the signal from source 2 will be compared to the stored charge and any difference will cause a corresponding signal to be supplied to the output circuit 20.

As indicated above, source 2 may be any variable voltage source and the signal supplied to output circuit 20 may be employed as desired. Moreover, it will be apparent that where the current regulating device 10 is a transistor, the polarities of the circuit will depend upon the type of transistor employed. In addition, numerous variations and modifications may be made without departing from the present invention. Accordingly, it should be clearly understood that the form of the present invention described above and shown in the figure of the accompanying drawing is illustrative only and is not intended to limit the scope of the invention.

What is claimed is:

1. Synchronizing means comprising:
a variable voltage source,
voltage storage means connected across said source,
means operable in a first condition to cause the voltage on said voltage storage means to vary with the voltage of said source and operable in a second condition to cause said voltage storage means to store a desired value of voltage,
current regulating means connected to be responsive to the difference between the voltage stored on said voltage storage means and the voltage supplied by said source, and operable to pass current in an amount determined by said difference,
an output circuit, and
means for establishing a voltage across said output circuit having a value functionally related to the amount of current passed by said current regulating means.

2. Synchronizing means comprising:
a variable voltage control signal source,
a capacitor connected across said source,
switch means connected in series between said control signal source and one side of said capacitor,
current regulating means connected to be responsive to the difference between the voltage stored on said capacitor and the voltage supplied by said source and operable to pass current in an amount determined by said difference,
an output circuit, and
means for establishing a voltage across said output circuit having a value functionally related to the amount of current passed by said current regulating means.

3. Synchronizing means comprising:
a variable voltage source,
a capacitor connected across said source,
switch means operable in a first condition to cause the voltage on said capacitor to vary with the voltage of said source and operable in a second condition to cause said capacitor to store a desired voltage,
current regulating means connected to be responsive to the difference between the voltage stored on said capacitor and the voltage supplied by said source and operable to pass current in an amount determined by said difference,
an output circuit, and
means for establishing a voltage across said output circuit having a value functionally related to the amount of current passed by said current regulating means.

4. Synchronizing means comprising:
a capacitor having a first side and a second side;
a variable voltage source connected to apply a first electrical charge to said first side of said capacitor;
switch means connected in series between said second side of said capacitor and said source operable in a first condition to apply a second electrical charge to said second side of said capacitor of equal magnitude and opposite polarity to said first charge and operable in a second condition to cause said capacitor to store a desired voltage;
current regulating means having a positive electrode, a negative electrode, and a control electrode, said control electrode being connected to said second side of said capacitor and serving to cause said current regulating means to pass current in amount responsive to the difference between the voltage stored on said capacitor and the voltage supplied by said source;
an output circuit; and
means for establishing a voltage across said output circuit having a value functionally related to the

5 amount of current passed by said current regulating means.

5. An automatic pilot ssytem for an airplane, said system comprising:
an attitude sensing gyroscope means,
demodulating means for converting the output of said gyroscope means to a variable voltage signal,
a capacitor connected across said demodulating means,
switch means connected in series between said demodulating means and one side of said capacitor,
current regulating means connected to be responsive to the difference between the voltage stored on said capacitor and the signal from said demodulating means, and operable to pass current in an amount determined by said difference,
servomechanism means for controlling the attitude of said airplane, and,
means for supplying a voltage to said servomechanism means having a value functionally related to the amount of current passed by said current regulating means.

6. An automatic pilot system for an airplane, said system comprising:
an attitude sensing gyroscope means;
a capacitor having a first side and a second side;
demodulating means for converting the output of said gyroscope means to a variable voltage signal and applying said signal to said first side of said capacitor;
switch means connected in series between said second side of said capacitor and said demodulating means operable in a first condition to apply an electrical charge to said second side of said capacitor to store a desired value of said signal voltage;
current regulating means having a positive electrode, a negative electrode, and a control electrode, said control electrode being connected to said second side of said capacitor and serving to cause said current regulating means to pass current in an amount responsive to the difference between the voltage stored on said capacitor and the voltage supplied by said demodulating means;
servomechanism means for controlling the attitude of said airplane; and
means for supplying a voltage to said servomechanism means having a value functionally related to the amount of current passed by said current regulating means.

References Cited

UNITED STATES PATENTS

| | | | |
|---|---|---|---|
| 2,464,279 | 3/1949 | Zarem et al. | 320—1 |
| 3,211,984 | 10/1965 | Jones | 320—1 |
| 3,267,296 | 8/1966 | Fuss | 307—88 |
| 3,286,143 | 11/1966 | Kurtz et al. | 318—18 |

BENJAMIN DOBECK, *Primary Examiner.*

U.S. Cl. X.R.

320—1